United States Patent
Bründermann

[11] Patent Number: 6,147,317
[45] Date of Patent: Nov. 14, 2000

[54] METHOD FOR PRODUCING FINNED TUBES AND FINNED TUBE PRODUCED THEREBY

[76] Inventor: Georg Bründermann, Hauptstrasse 32, 49832 Thuine, Germany

[21] Appl. No.: 08/193,032

[22] PCT Filed: Jul. 17, 1992

[86] PCT No.: PCT/DE92/00591

§ 371 Date: Feb. 3, 1994

§ 102(e) Date: Feb. 3, 1994

[87] PCT Pub. No.: WO93/02829

PCT Pub. Date: Feb. 18, 1993

[30] Foreign Application Priority Data

Aug. 3, 1991 [DE] Germany ............... 41 25 789

[51] Int. Cl.$^7$ ..................................... B23K 9/173
[52] U.S. Cl. ....................... 219/61; 219/125.11
[58] Field of Search ................. 219/60 R, 61, 219/62, 137 R, 125.11; 29/726

[56] References Cited

U.S. PATENT DOCUMENTS

| 3,246,116 | 4/1966 | Anderson et al. ........... 219/61 |
| 3,436,517 | 4/1969 | Pignal ........................ 219/60 R |
| 3,557,427 | 1/1971 | Pignal ........................ 29/726 |
| 3,662,942 | 5/1972 | Pignal ........................ 228/25 |

FOREIGN PATENT DOCUMENTS

| 2342817 | 9/1977 | France . |
| 2421010 | 10/1979 | France . |
| 2458346 | 1/1981 | France . |
| 3508878 | 1/1990 | Germany . |
| 9102944 | 7/1991 | Germany . |
| 1120385 | 7/1968 | United Kingdom . |

*Primary Examiner*—Clifford C. Shaw
*Attorney, Agent, or Firm*—Brooks & Kushman P.C.

[57] ABSTRACT

Figure 1:
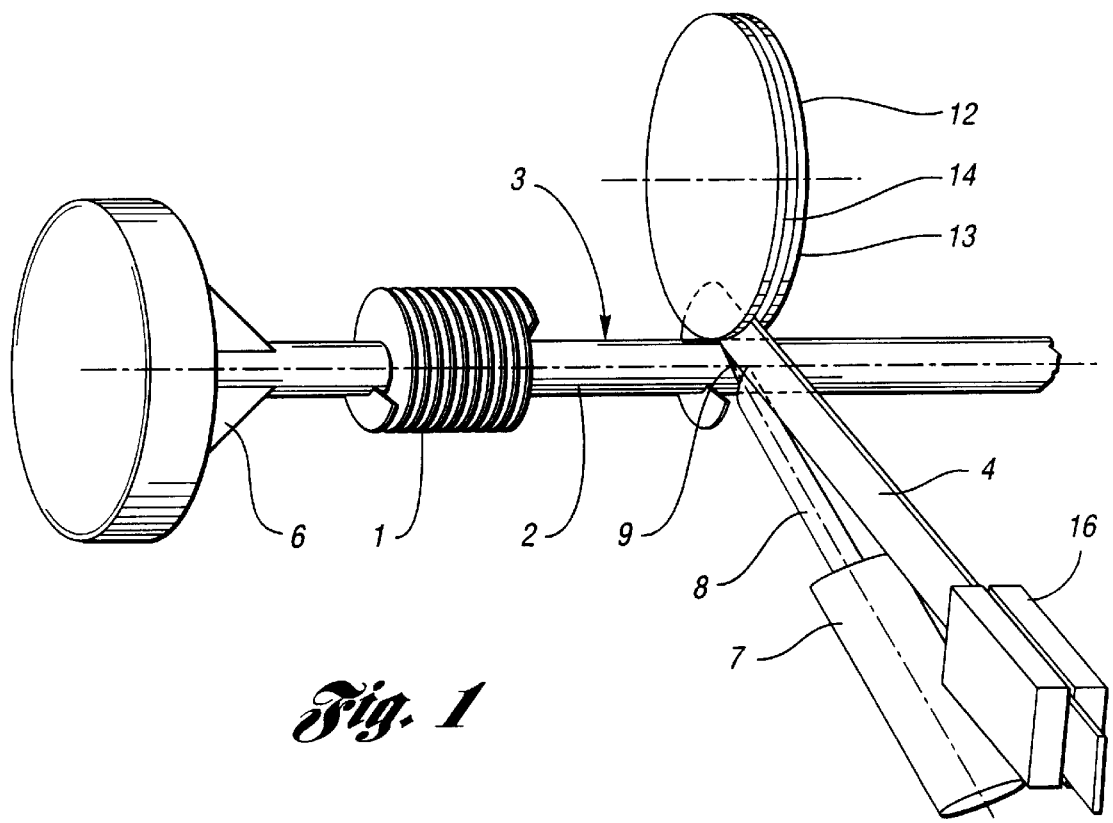

The invention relates to a finned tube (1), a process for its manufacture and a device for performing the process. The process involves at least one endless strip (4), forming the fins, being wrapped around a rotating tube body (2) in roughly helical fashion and the narrow side of the strip (4) facing the tube body (2) being joined to the tube surface by means of a welding device (7). In order to be able to work with little financial outlay and in an energy-saving manner, and to create a product where the entire width of the base of the fin is optimally joined to the tube surface and the joint area displays good thermal conduction, the working end of the welding device (7) is inserted into the free wedge-shaped space between the tube surface (3) and the strip (4) where, with the aid of the welding device (7) a welding bead (11) is applied, running exactly in the area of the joint between the strip (4) and the tube surface (3), to the tube surface (3) using a filler, before the narrow edge of the strip (4) to be joined makes contact. The narrow edge of the strip (4) to be joined is subsequently pressed into the welding bead (11) while it is still liquid. (FIG. 1)

3 Claims, 3 Drawing Sheets

METHOD FOR PRODUCING FINNED TUBES AND FINNED TUBE PRODUCED THEREBY

The invention relates to a finned tube made of metal, particularly a heat-exchanger tube, consisting of a cylindrical tube body and a strip wrapped around it in helical fashion, the broad sides of which are roughly perpendicular to the tube surface and whose narrow side facing the tube surface is joined to the tube surface by a welded seam, as well as a process for its manufacture and a device for performing the process. The process involves at least one endless strip, forming the fins, being wrapped around a rotating tube body in roughly helical fashion and the narrow side of the strip facing the tube body being joined to the tube surface by means of a welding device.

In a familiar process of the aforementioned type (DE-PS 35 08 878), the strip forming the fin is welded to the pipe jacket on one side. In order to make effective use of larger heat exchange surfaces in this context, the welded seam to be made has to be relatively broad, this entailing the disadvantage of a need for larger amounts of welding filler and welding energy. Furthermore, this can subsequently lead to shrinkage cracks and increased corrosion. In the familiar process, the welding device is located laterally alongside the strip to be wrapped.

In another familiar process (DE-GM 91 02 944), welded seams are to be applied to both sides of the fin, so that the full width of the narrow edge of the fin is joined to the tube body. This process can only be applied if the individual fins of the wrapped strip are sufficiently far apart that the second welding device can be inserted into the gap between two fins. Apart from this, however, the same disadvantages are involved as with the first-named process.

Moreover, both of the familiar processes have the disadvantage that the application of the relatively thick welded seams permits only low working speeds.

Therefore, the invention is based on the task of developing a new manufacturing method which works in an economical and energy-saving manner with little outlay and leads to a product where the entire width of the base of the fin is optimally joined to the tube surface and the joint area displays good thermal conduction.

According to the invention, this task is solved by a process characterised in that the working end of the welding device is inserted into the free wedge-shaped space between the tube surface and the strip to be wrapped, in that the welding device is used to apply a welding bead, which runs exactly in the area of the joint between the strip and the tube surface, to the tube surface using a filler, before the narrow edge of the strip to be joined makes contact, and in that the narrow edge of the strip to be joined is pressed into the welding bead while it is still liquid.

The process pursuant to the invention can be performed with a minimum of energy and a very small amount of welding filler. Furthermore, this process is characterised by the fact that a welding speed can be used which is several times greater than that of the conventional welding process. The joint between the tube material and the welded seam can be regarded as a metallurgical bond. Depending on the boundary conditions selected, it is also possible, if necessary, to generate a metallurgical bond between the base of the fin and the welded seam. Optimum welding of this kind ensures undisturbed heat transfer between tube and fin, zones of overheating being avoided at the same time.

The welding bead to be applied to the tube surface, which need only be relatively thin, is designed to be roughly as wide as the thickness of the strip. This ensures that the welded seam reliably covers the entire width of the joint area and possibly projects slightly beyond the respective fin at the sides.

It is expedient to keep the strip to be wrapped around the tube surface under tensile strain, so that the strip is pressed into the welded seam with a certain amount of force of pressure.

However, it is also possible specifically to press the strip forming the fins into the welded seam by means of force applied in the radial direction, this further improving the welded joint.

In order to aim for a continuously homogeneous welded joint, the narrow edge of the strip to be joined can additionally be fused by means of the welding device.

The welding device is preferably guided at the same angle relative to the tube axis as the strip forming the fins which is to be fed in. This measure ensures that consistent welding conditions are achieved over the entire width of the welded seam to be produced and that a thin, homogeneous welded seam is generated over the entire width.

The welding area is expediently blanketed with inert gas in order to optimise the welding process.

The device pursuant to the invention for performing the process consists in the familiar fashion of a clamping device for the tube to be wrapped, a drive unit for the clamping device to rotate the tube about its longitudinal axis, and a slide designed to accommodate the strip supply reel and the welding device, said slide being capable of moving relative to the longitudinal direction of the tube, parallel to the tube axis. The new device is characterised by the fact that at least one electrode projects from the welding device into the free wedge-shaped space between the tube surface and the strip to be wrapped tangentially around the tube, that a consumable, endless welding wire can be fed automatically through the electrode, that the welding wire can be guided at a distance from the area in which the strip to be wrapped makes contact with the surface of the tube, and that, with the aid of the welding wire, a welding bead can be generated, into which the strip to be wrapped can be pressed.

Furthermore, in the device pursuant to the invention, a guide roller for the strip, which reaches over the strip with lateral flanges, can be located immediately above, or a short distance behind, the area in which the strip to be wrapped around the tube body makes contact, said guide roller having a cylindrical pressure surface at the base of the mounting area formed by the two flanges to exert pressure on the outward-pointing edge of the strip.

Furthermore, the electrode can be mounted in a supporting head, which also displays a feed device for the inert gas. As an alternative, however, it is also possible to supply the inert gas via a separate nozzle.

On the finned tube pursuant to the invention, the welded seam is formed with the aid of a filler and has a roughly constant, relatively small thickness over its entire width. Depending on the targeted quality, the welded seam can enter into a metallic bond both with the tube surface and with the underside of the strip forming the fins.

The cross-section of the welded seam is preferably designed in the form of a rectangle, the long sides of which lie parallel to the tube surface.

The welded seam preferably projects slightly beyond the welded-on strip on both sides.

Figure 2:
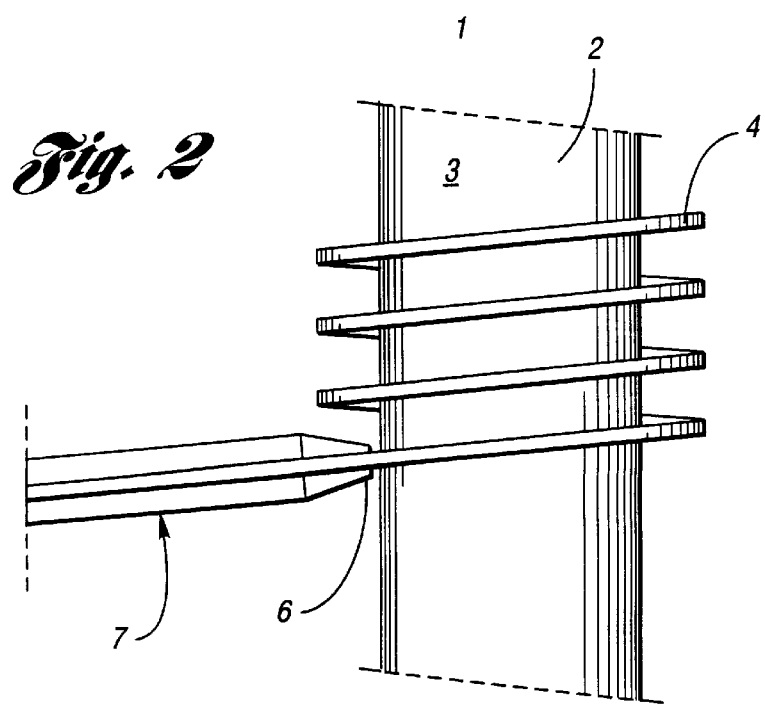
Figure 3:
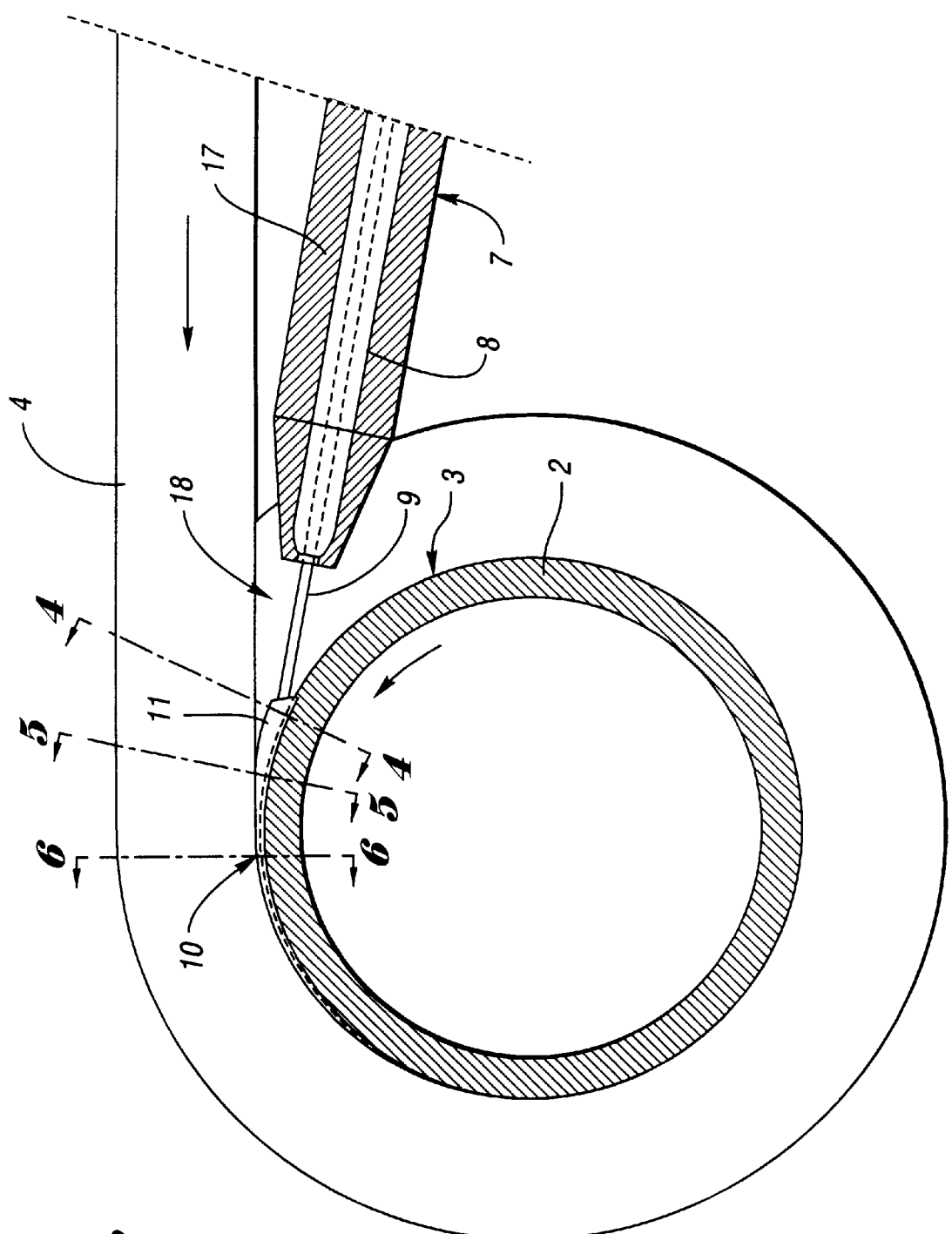
Figures 4, 5, 6:
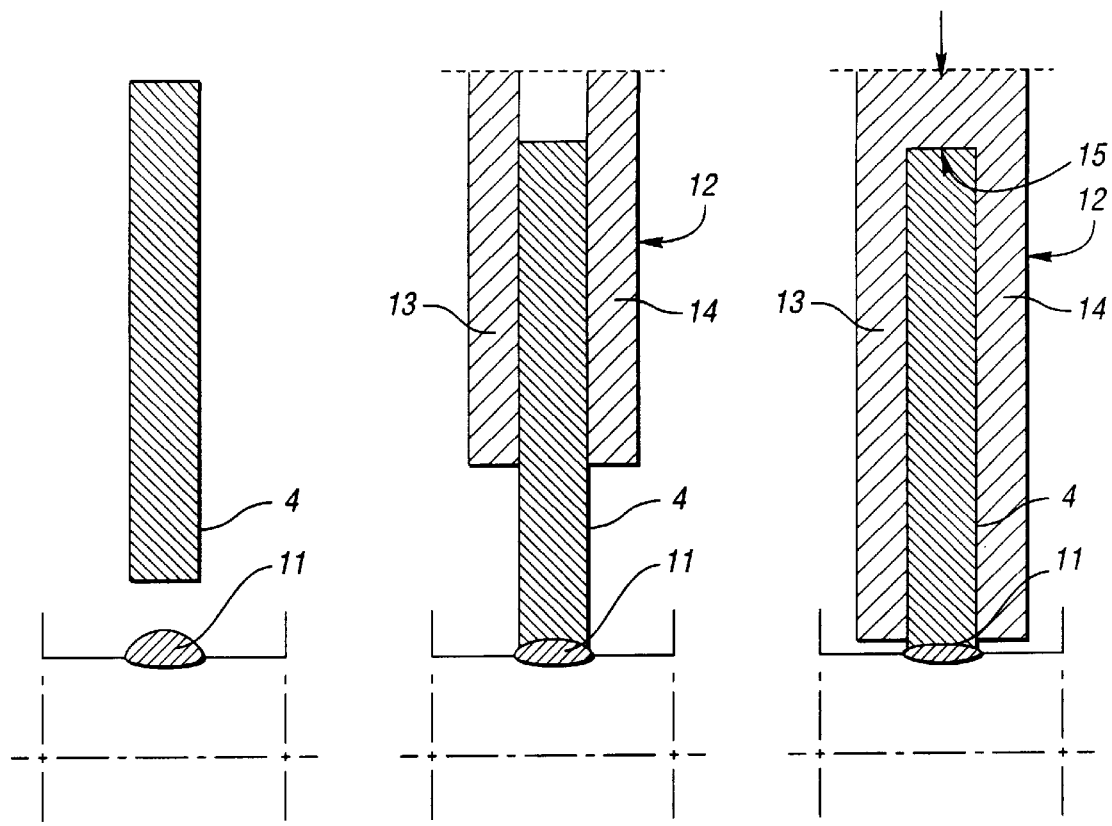

The invention is illustrated in exemplary form in the drawings and explained in detail below on the basis of the drawing. The drawings show the following:

FIG. 1 A schematic representation of a perspective view of the device,

FIG. 2 A top view of the device in the region of the strip to be wrapped,

FIG. 3 A section through the tube in the region of the welding device,

FIG. 4 A section along line I—I in FIG. 3,

FIG. 5 A section along line II—II in FIG. 3,

FIG. 6 A section along line III—III in FIG. 3, and

Figure 7:
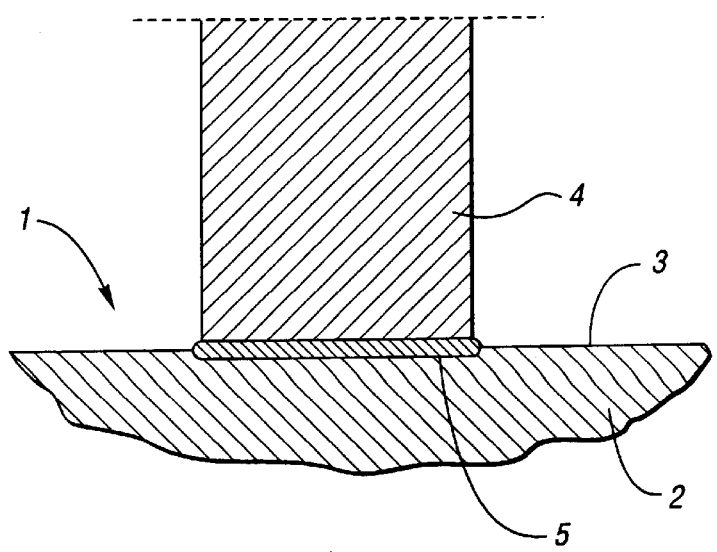

FIG. 7 A section through a part of the finished finned tube in the region of the welded seam.

According to the drawing, the heat exchanger tube (1) comprises a tube body (2), to whose surface (3) a finning strip (4), fed from a supply reel not illustrated in the drawing, is applied in helical fashion to increase the heat exchange area and joined to the tube surface by a welded seam (5).

As can be seen from FIG. 7, in particular, which shows an idealised embodiment, the welded seam (5) has a roughly constant, comparatively small thickness over its entire width. The cross-section of the welded seam (5) is designed in the manner of a rectangle, where the long sides of the rectangle lie parallel to the tube surface. In practice, however, it is also possible, depending on the welding conditions selected, for the welded seam (5) to have a slightly arcshaped form, sagging somewhat towards the middle. The welded seam (5) projects slightly beyond the welded-on strip (4) on both sides.

According to FIGS. 1 and 2, the device on which the heat exchange tube (1) is manufactured consists of a clamping device (6), a drive unit, not illustrated in detail, for the clamping device (6) to rotate the tube body (2) about its longitudinal axis, and a slide, not illustrated in detail, which is capable of motion in the longitudinal direction of the tube body (2), parallel to the tube axis, and is designed to accommodate the strip supply reel and the welding device (7).

An electrode (8) projects from the welding device (7) into the free wedge-shaped space between the tube surface (3) and the strip (4) to be wrapped tangentially onto the tube body (2). A consumable, endless welding wire (9), which serves as the welding filler, can be fed automatically through the electrode (8).

As can be seen from FIG. 3, in particular, the welding wire (9) is fed in a short distance ahead of the area (10) where the strip (4) to be wrapped makes contact with the tube surface (3). The welding wire (9) melts in the arc occurring between the end of the welding wire (9) and the tube surface (3), thus creating a welding bead (11) on the tube surface (3), into which the edge, pointing downward in FIG. 3, of the strip (4) to be wrapped is gradually immersed.

As illustrated in FIG. 1, a guide roller (12) for the strip (4), which reaches over the strip (4) with lateral flanges (13 and 14), is located immediately above, or a short distance behind, the area (10) of contact of the strip (4) to be wrapped around the tube body (2). Details can be seen in the enlarged sections in FIGS. 4 to 6. As can be seen from FIG. 6, in particular, the guide roller (12) has a cylindrical pressure surface (15) at the base of the mounting area formed by the two flanges (13 and 14), which exerts a force of pressure on the free, upward-pointing edge of the strip (4), thus pressing the strip (4) highly accurately and under high pressure into the welding bead (11) previously applied to the tube surface (3).

A certain contact pressure can also be achieved by keeping the strip (4) under tension during wrapping by means of a tensioning device (16), illustrated schematically in FIG. 1. However, the additional contact pressure applied by the pressure surface (15) of the guide roller (12) results in a particularly reliable and homogeneous joint between the strip (4) and the tube surface (3).

Depending on the given boundary conditions, particularly the selection of the electrode and the other operating conditions, the underside of the strip (4) can also be fused, so that a metallurgical bond is formed continuously, from the tube body (2), via the welded seam (5) and onto the fins, this ensuring undisturbed heat transport.

As illustrated in FIG. 3, the electrode (8) is located in a supporting head (17), which also serves to feed an inert gas (18) surrounding the welding area.

By using the process pursuant to the invention, which can be referred to as a fusing-jointing-pressing-welding process, a product of particularly good quality is obtained. The process can even be used with very closely spaced fins. The welding energy to be applied and the amount of welding filler are the same as with conventional welding processes, while the working speed is substantially higher, meaning that each metre of welded seam requires only a fraction of the former energy and a fraction of the former amount of welding filler.

1 Heat exchanger
2 Tube body
3 Tube surface
4 Finning strip
5 Welded seam
6 Clamping device
7 Welding device
8 Electrode
9 Welding wire
10 Area of contact
11 Welding bead
12 Guide roller
13 Lateral flange
14 Lateral flange
15 Cylindrical pressure surface
16 Tensioning device
17 Supporting head
18 Inert gas

What is claimed is:

1. A finned tube made of metal comprising at least one endless strip wrapped around a rotating tube body in helical fashion to form the fins, wherein a narrow edge of the strip facing the tube surface is joined to the tube surface by a welded seam using a filler, the improvement comprising the welded seam having a constant, small thickness over its entire width, the welding bead running exactly in the area of the joint between the strip and the tube surfaces to the tube surface before the narrow edge of the strip to be joined makes contact, wherein the welding bead is as wide as the thickness of the strip, and the narrow edge of the strip to be joined is pressed into the welding bead while it is still liquid.

2. Finned tube as per claim 1 wherein a cross-section taken across the welded seam has a rectangular configuration whose long sides lie parallel to the tube surface.

3. Finned tube as per claim 2 wherein the welded seam projects slightly beyond the welded-on strip on both sides.

* * * * *